United States Patent [19]

Ishida

[11] Patent Number: 4,912,671

[45] Date of Patent: Mar. 27, 1990

[54] ELECTRONIC DICTIONARY

[75] Inventor: Keiko Ishida, Kashiwa, Japan

[73] Assignees: Hirode Miwa; Tokyo Kosumosu Denki Kabushiki Kaisha, both of Kanagawa, Japan

[21] Appl. No.: 82,035

[22] Filed: Aug. 5, 1987

[30] Foreign Application Priority Data

Aug. 8, 1986 [JP] Japan .................. 61-186178

[51] Int. Cl.⁴ .................. G06F 15/38; G09B 19/06
[52] U.S. Cl. .................. 364/900; 364/975.0; 364/927.0; 364/920.1; 364/920.4; 364/419; 434/157
[58] Field of Search .................. 364/419, 200, 900; 434/156, 157

[56] References Cited

U.S. PATENT DOCUMENTS

| 4,393,462 | 7/1983 | Tanimoto et al. | 364/900 |
|---|---|---|---|
| 4,467,446 | 8/1984 | Sukurai | 364/419 X |
| 4,489,396 | 12/1984 | Hashimoto et al. | 434/157 X |
| 4,507,750 | 3/1985 | Frantz et al. | 364/900 |
| 4,509,137 | 4/1985 | Yoshida | 434/157 X |
| 4,542,478 | 9/1985 | Hashimoto et al. | 364/900 |
| 4,579,533 | 4/1986 | Anderson et al. | 434/157 |
| 4,594,686 | 6/1986 | Yoshida | 434/156 X |
| 4,623,985 | 11/1986 | Morimoto et al. | 364/900 |
| 4,635,199 | 1/1987 | Muraki | 364/419 |
| 4,641,264 | 2/1987 | Nitta et al. | 364/900 |
| 4,658,374 | 4/1987 | Tanimoto et al. | 364/419 |
| 4,674,066 | 6/1987 | Kucera | 434/157 X |
| 4,703,425 | 10/1987 | Muraki | 364/419 |
| 4,730,269 | 3/1988 | Kucera | 364/900 |
| 4,731,021 | 3/1988 | Chan | 434/156 |
| 4,733,368 | 3/1988 | Morimoto et al. | 364/419 |
| 4,747,053 | 5/1988 | Yoshimura et al. | 364/419 |
| 4,774,596 | 9/1988 | Hashimoto | 364/419 X |

Primary Examiner—Parshotam S. Lall
Assistant Examiner—Joseph L. Dixon
Attorney, Agent, or Firm—Bauer & Schaffer

[57] ABSTRACT

Data E of index words C and their description D are stored in a large capacity memory medium (ROM). The data E is read by means of a ROM player, an index word C once retrieved and all or a portion of its description are stored in a RAM memory in the form of a word lists characterized by an attribute note to define the nature of the list, such as memorized and unmemorized words. A learing assistant function is provided to recall selected words from the list, permitting a user to practice the user's memory etc. The dictionary may be in a single language in which the words indexed and their descriptions are indicated by the single language, e.g. the English-English dictionary etc., or the dictionary may be in multiple or plural languages in which the index word C and its description D are indicated by different languages, e.g., the English-Japanese dictionary etc.

6 Claims, 1 Drawing Sheet

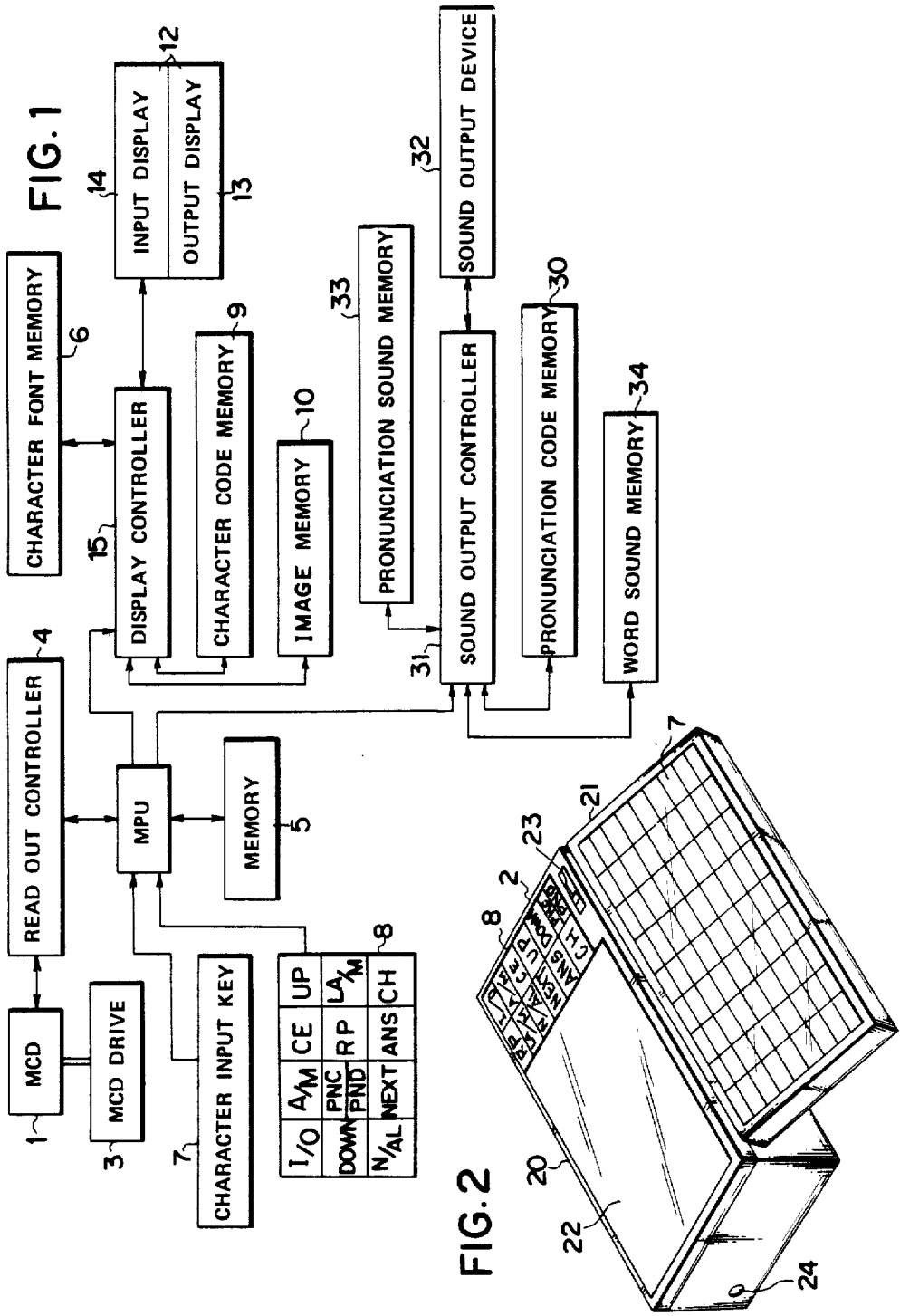

ELECTRONIC DICTIONARY

FIELD OF THE INVENTION

The present invention relates to an electronic dictionary and learning device wherein words of two or more languages (index words) and their descriptions are stored in a large capacity memory medium (ROM), and from which selected words and descriptions can be retrieved and compared with the users input, and capable of having visual, print or sound output.

PRIOR ART

In recent years, optical disks or compact disks, which will be simply referred to hereinafter as "CD" have appeared as digital storage or memory media for image or music data. When a CD, even having a small capacity, is used to record books, the contents of ten to one hundred books can be stored on each disk, thus providing the scale equivalent to that of a small library. It has been recently announced that an electronic dictionary was made by storing the contents of a twenty volume English encyclopedia on to one CD. In this particular example, all twenty volumes were stored on only about 20% of the storage capacity (540 MB) of the CD.

THE PROBLEMS WITH THE PRIOR ART

When compared to printed dictionaries, electronic dictinaries are advantageous in that they index simply and have the ability of reading the index at a high speed. They are also easy to see because a large-sized character display can be used. On the other hand, the problems therewith are as follows.

(a) Since only the description for the index word can be given or inputted by the user to the conventional electronic dictionary, it is necessary, in order to use the dictionary as a memory learing tool, to separately list the index words memorized and to successively identify the ones which have been memorized by repeatedly consulting the list. So that the list would not become unwieldly, it was also necessary to constantly delete from the list, the memorized words or to skip portions of the list at the time fo repetition. For this reason, much labor war required to use such a dictionary as a learning device.

(b) Since the electronic dictionaries described above are of a large scale, comparable to that of the electronic libraries, they are generally useless because their dimensions are too large for use as a portable small electronic dictionary.

(c) Since the conventional CD is not directed for use exclusively as an electronic dictionary medium, but is for general use, its operation is to complicated. In addition, since the most important use of CD media is for general purposes the CD is constituted so that it is usually employed with a personal computer or a small-sized computer etc. However, the entire system thus became large and expensive even though a so-called small and inexpensive personal computer is employed.

(d) Generally, the CD reader comprises a slidable deck which must be withdrawn from a cabinet or housing in order to set the CD on it. Thereafter, the CD deck is reinserted into the cabinet for a second time. While this permits easy exchange of many kinds of CDs, thus enabling the CD reader to be widely used for many purposes, such a structure is complicated and expensive. In addition, the CD reading unit thus comes into contact with air, so that dust may be admitted leading to the likelihood of an occurence of error reading or other trouble.

(e) IC memory cards or magnetic bubbles presently available are stable against dust. However, because of small memory density, they must be made too large in dimension and expensive when a large capacity storage medium is required.

OBJECTS OF THE INVENTION

To solve each of the above-mentioned problems, an object of the persent invention is to provide an electronic dictionary and learning device (hereinafter referred to in combination as the "electronic dictionary"), which is small and easy to operate, easily portable, free from trouble and maintenance free over a long time period, and is inexpensive because of its use of microcompact disks, IC memory cards or maganetic bubbles, etc., as the storage media, should these be available in the future when they are miniaturized.

Another object of the present invention is to obtain an electronic dictionary functioning to automatically or manually perserve, in a separate word list, any word indexed in the ROM thus making it possible to use such a list for the memorization by the user, of words and description.

SUMMARY OF THE INVENTION

The electronic dictionary of the present invention is composed of a large capacity memory medium ROM, in which the multi-language data E of the index words C and the descriptions D corresponding to the index words forming the selected dictionary is stored. A reading device for retrieving the data E from the ROM, in a selected combination of lanuages, is provided, as well as means to effect display, printing or sound output. The description D includes for each index word C, at least one pronunciation symbol, a translation of the index word, and at least one correlated word F defining the meaning or use of the index word C (e.g., modified work of a part of speech, modified word of gender, number or time, idiomatic phrase,, or idiom etc.). An index word C once retrieved, and all of its description D or a desired portion thereof may be automatically or manually preserved in a separate memory RAM. Thus, a learning assistance function is provided such that the user may practice the memorization of words by individually recalling the word and/or the description onto the display unit.

The electronic multiple language dictionary of the present invention is applicable not only to an individual dictionary, e.g., an English-Japanese dictionary or converse a Japanese-English dictionary, but also to an electronic dictionary in which both dictionaries, as well as other dictionaries can be combined and stored in pairs.

BRIEF DESCRIPTION OF THE DRAWINGS

FIG. 1 is a block diagram illustrating one embodiment of an electronic dictinary according to the present invention; and FIG. 2 is a perspective view illustrating the structure in which the electronic dictionary according to the present invention is embodied.

DETAILED DESCRIPITON OF THE INVENTION

To realize an electronic dictionary which is small-sized, stable and inexpensive, and is able to be carried easily, it is required that a ROM be prepared which is as small as possible, particularly when a disk is employed. Such ROM device is illustrated herein as the standardized microcompact disk (which is abbreviated as "MCD" hereinafter) having the necessary and sufficient memory capacity for the intended use of the dictionary.

So that the electronic dictionary can be received in the breast pocket, which is the smallest among the pockets of clothing, it is preferable that one side of the small-sized ROM i.e., the outer diameter of MCD be less than 3 inches.

When viewed from the number of characters of a printed dictionary, the necessary memory capacity of the MCD for a single Chinese character is 2B (bytes). The necessary memory capacities for converting small, medium and large dictionaries, as sold in book stores, in a combined English-Japanese, Japanese-English dictionary as typical examples, are as follows:

|  | English-Japanese | English-Japanese + Japanese-English |
| --- | --- | --- |
| small dictionary | ~3 MB | ~6 MB |
| medium dictionary | ~6 MB | ~12 MB |
| large dictionary | ~40 MB | ~80 MB |

Since it is desriable that an "English-Japanese" dictionary and an "Japanese-English" dictionary be paired for practical use, it is necessary that the memory capacity be approximately two times that of the capacity of the single English-Japanese dictionary. To insure sufficient capacity for the large size electronic dictionary, a capacity somewhat less than 128 MB is required. Even in the case of a simple "English-Japanese" dictionary, where memory capacity will be minimum, a capacity of more thant 2 MB is required.

Thus, a fixed storage media can be constituted by an I.C. memory card, with mask ROM, EPROM, or EEPROM etc., because of its non-volatile property. However, any memory medium having a low memory density, e.g., chips having 256 K bit to 1 M bit per each chip may be used. When an electronic dictionary is made having a memory capacity of 2 MB, 96 to 24 chips will be required. In such event, the electronic dictionary becomes large and expensive. Magnetic bubbles are non-volatile and have a relatively high memory density (4M bit/chip). However, the dimension of the peripheral magnetic circuit/drive circuit for each clip is large. When an electronic dictionary is made with such components to have a memory capacity of 3 MB, its size is too large and its cost is also too high.

However, both the memory density of the memory card and the density of the magnetic bubbles, have been increasing at the rate of four times every three years. Accordingly, it is expected that they will both become, in time, so miniaturized and inexpensive that they can be put to practical use. Further, where phonetic symbols or characters are used, the capcity needed woll be reduced about one half. Therefore, and electronic dictionary will be realized in the near future using a memory card or magnetic bubble with the small-sized ROM of the present invention. Such memory devices will have no moveable parts, so that they are readily influenced by dust or vibration etc.

The present invention is however, explained hereinafter using the presently existing MCDs. In the conventional CD, comprising a flat disk having an outer diameter of 120 mm, there includes a concentric invalid region having a diameter of about 45 mm in the center thereof. The outer region, comprising the effective storage area, expressed as $[\tau 1/4 (120)^2 - \tau 1/4 (45)^2]$ mm$^2$ contains about 540 MB as the nuber of bytes utilized by a user for storage. The memory density thereof is fixed within the effective area. When it is assumed that the outer diameter is 3 inches (about 75 mm), and the MCD is made up to have the same memory density and to store data of 128 MB, the invalid region has a diameter approximately equal to that of the invalid region of the conventional CD. In this case, the width of the radial direction for the annular section of the valid area is about 15 mm. Thus, the MCD which has only a small difference between the inner and outer radius, is simple and inexpensive as a track selection mechanism. Since the difference between the circumferential line speed of the inside track and that of the outside track at any given MCD rotational frequency is reduced, the fixed rotational frequency system may be employed. Even when the rotational frequency control is operated so that the circumferential speed is fixed, the ratio of the control rotational frequency is nearly equal to 1. Thus, a servo control system which is simple and inexpensive can be used.

An embodiment is possible where the MCD itself is also small-sized and its thickness is small as well, resulting in a low cost MCD. In addition, various modifications may be implemented, such that the diameter of the invalid region is further reduced, allowing the outer radius of the disk to be less than 3 inches or to reduce the cost of lowering the memory density, and the like.

It is desirable that the dictionary of the invention be capable of use immediately upon being powered. For this purpose, it is desirable that the MCD be always incorporated within the ROM player without the need to first insert the MCD into the ROM player or the need to detach it after every use. However, if the MCD is left in place for a long time, or the MCD is carried within the ROM within a pocket or a bag, dust may be admitted into the MCD, with the result that trouble or error reading is likely to occur. Accordingly, the MCD and track selection mechanism for which precision is also required, may be placed in a chamber of a dust-proof structure attached to the exterior and connected through the drive shaft of the track selection mechanism and an electric wire, thus preventing dust from being admitted. By opening and closing the cover of the chamber, the exchange of the MCD may be carried out.

The cover, the penetrating shaft, and the penetrating electric wire are sealed from exposure to air by means of packing such as a plastic blister, etc. It is preferred that the method of fitting or detaching the cover be carried out by means of screws etc., so that it can be made difficult to open or close the cover, preventing the easy exchange of the MCD. When needed, the fastener may be sealed, (e.g. stuck), thereby prohibiting an unwanted user from opening or closing the cover, and thus clarifying maintenance responsibility. However, since there may also be a need to exhange one memory for another i.e., to employ languages different from each other, or for the use of dictionaries of another scale (small, medium and large dictionaries etc.,) or for technical term dictionaries etc., it is desirable that the MCD can be exchanged, although such exchange should be kept as difficult as possible. For this purpose, there may be empolyed a method such that the connection and detaching of the MCD cannot be effected unless, for example, three or more operations are conducted.

It is preferable that the electronic dictionary of the invention should be handled as simply as possible. For this reason, it is desirable that the apparatus as a whole be of unitary structure and that the MCD be incorporated within the ROM player and that only the necessary minimum number of keys be provided on the control unit thus limiting the player to its special use, excluding general use as far as possible.

FIG. 1 is block diagram illustrating an electronic two language dictionary wherein such a MCD as defined is used as a small-sized ROM on which an English-Japanes dictionary and a Japanese-English dictionary paired in combination are stored.

In this figure, MCD denotes a microcompact disk, and numeral 3 denotes a MCD drive for rotating the MCD, which comprises a motor and a servo system etc. Reference numeral 4 denotes a readout controller for reading data from the MCD, which includes an optical reader for the MCD, a track selection mechanism and its controller, a mutual conversion circuit for effecting conversion of the user byte (8 bits) to a CD byte (14 bits) and vice versa, an error correction circuit, and the like. Conventional technology employed with conventional CD can be applied to these circuits. A portion of these functions may be realized by using a microcomputer of microprocessor MPU.

Reference numeral 5 denotes a RAM memory associated with the MPU. Reference numeral 7 denotes a key board 7 for inputting data and operating instructions. Since the characters of the Japanese language are too many for use in a combined English-Japanese and Japanese-English dictionary, it is desirable to provide input characters in the form of Roman letters. Such an inputting method is convenient in that the operation can be performed using the alphabet for both the English-Japanese dictionary or the Japanese-English dictionary. In addition, in storing languages where the variety of the letters are not too-many and the character fonts extremely different from each other as in the Arabic, a method to indicate at least two kinds of different characters, such as Katakana or Roman letters on the key top may be used. The desired character may be selected by operating the shift key or by fitting an overlay over the keys or the like.

Reference numeral 8 denotes a function key group. The key labeled [A/M] is the input mode key, the key labeled [I/O] is the input/output key, the key labeled [CE] is the clear key, the key labeled [ ↑ ] is the scroll up key, the key labeled [ ↓ ] is the scroll down key, and the keys labeled [PNC] and [PND] are the pronunciation keys. A key labeled [LA/M]is the learning mode key, the key labeled [N/AL] is the select key, the key labeled [RP] is the repeat key, the key labeled [NEXT] is a next word key, and the key labeled [CH] is the attribute change key.

Reference numeral 6 denotes a character font memory for generation of the character font. When a language used is fixed, a mask ROM may be used. Further, a method may be employed to use a RAM to store character font data fixed in the MCD in advance, by effecting copying from the MCD to RAM as a portion of the initial sequence when powered. The last mentioned method is advantageous where various languages are to be handled through the exchange fo the MCD or even in the same MCDS. In addition, EE-PROM may be used.

Reference numeral 15 denotes a display controller which writes a character sent form the MPU into an image memory 10 by making use of the character font memory 6, depending upon whether a dispaly unit 12 is of the storage type or of the refresh type. The control 15 drives the display unit 12.

The display unit 12 is divided into an output display section 13 and an input display section 14. For these display sections 13 and 14, a planar type display device such as a liquid crystal, photo-chronic, or El (Electroluminescence) etc., may be used. A liquid crystal display as used in a portable liquid crystal television, is suitable for the display device for reasons of lower power dissipation, low voltage, good use results, and low cost performance etc. It may however, be substituted for a home television monitor, etc., which is externally connectable. Instead of a visual display, the output/input may be fed to a printer of the simple type. Further, a method may be employed to allow the display unit 12 to have the funcition of a touch panel, thereby to display a character key or a function key in the input mode through the MPU so as to effect inputting operation by touching the portion displayed. This method permits the character input key 7 and the functional key group 8 to be omitted, thus enabling the dictionary to be further reduced in size. Furthermore, instead of the character input key 7 etc., a microphone and a voice recognition circuit may be used to conduct sound inputting.

For the purpose of miniaturizing the electronic dictionary to provide a desk-top or lap top type etc., it is preferable to employ a structure in which all components are unitarily housed. It is desirable to construct the keyboard 7 using pressure-sensitive elements etc., so that it is planar. Since a liquid crystal, which ahs touch-inputting function, permits the character keys to be omitted, such a display is advantageous in that it is not only effective for miniaturization and simplicity, but also makes it easy to change the character font display of the key top when conversion of the language is made through the exchange of the MCD etc.

The power supply can be an AC power supply, although employment of a battery as the power supply is more convenient. Since a power supply pack which functions as a battery and as a converter from AC to DC is widely used, the additional provision of such a power supply pack to the needed DC power supply of this invention is more convenient. It is also possible to use a rechargeable battery.

Since it is not desirable to allow the power switch to be unnecessarily cut off or turned on when initiating the rotation of MCD, or of the initial sequence or the like, it is perderable that the power switch be of the slide type.

When the electronic dictionary is fo the portable type, the area of the display device is limited and the capacity of the output display is also limited. There are many instances therefore, where the number of characters displayed in a lap-top is smaller than that in a desk-top, so that all the descriptions D are not displayed at the same time. In such a case, the above-mentioned scrolling function is helpful.

To protect the liquid crystal display or the function key board etc., from any impact or compression which may be externally applied during carrying of the electronic dictionary, the device is preferably enclosed in a housing 20. This cover may be in the form of a book or may be provided as the dictionary body itself and formed with a single swingable title leaf 21. Where the touch panel display is not used, it is convenient to provide a planar type character input key board 7 on the inside surface of a single swingable cover leaf 21.

Referring to FIG. 2, there is shown a substantially rectangular casing of the dictionary body, which is designated by numeral 20. The casing 20 corresponds to any one of the standard size books published at present so that it may be conveniently placed on a book shelf or carried within a tote bag, or the like. Reference numerals 22 and 23 denote the liquid crystal display and slide type power switch respectively. In addition, reference numeral 24 denotes a DC power terminal for connection to an external power supply.

The learning assistance funcition of the present invention will now be explained. It is desirable that not only students, but also the general public memorize words once indexed. For students, the degree of their memories are appraised by tests and the results affect promotion, admission to a school of higher grade, or graduation, etc. From time to time, university students or the general public endeavor to memorize new words to enhance their general ability. In learning and memorizing the meaning of new words, the usual method is to list the words in language A ona a word note or a index cart etc., together with their definitions and descriptions D using the language B and thereafter comparing the descriptions with the correct ones. In contrast, the spelling of words in the language A is learned by obtaining the correct description D in language B and thereafter committing the index words to memory by repeatedly looking at the correct index words for comparison. Ordinarily, at the next learning session, those words which have been memorized are skipped or the entire list of words quickly reviewed. The learning assistance function described below permits the preparation of a list of words to be memorized and provision of indicia to discriminate between those words remaining unmemorized from those previously memorized. The electronic dictionary provided with such a function can be said to be a so called "electronic word note".

Such a function can be realized in a manner described below by employing the keyboard 7 and function keys 8 to recall from the RAM one or more index words C together with their descriptions D. First, the recalled index word C and its description D are displayed on the input and output display sections 13 and 14, respectively. Thereafter, the index word C and the correlated word F are respectively displayed on the first and secondlines of the input display section 14, while the description D for the correlated word F is displayed on the lines below the first line of the output display section 13. Such content exists in the character code memory 9 in the form of a code so that, when the input/output [I/O] key is depressed, the MPU transfers the memory content into the memory 5 prior to switching of the input/output mode. The MPU also provides within the memory 5, a region for listing the words used and the listing is preserved in their order of inputting (in order of indexing), so that this region is not erased even when the power supply is cut. To effect this, the memory 5 is required to be a battery backed RAM, an electrically read and write magnetic bubble memory or an EEPROM or the like.

When the quantity of the output content is too much for the display section 13, the content transferred to the display is correspondingly limited to only a partial region corresponding to the first line, or the first and second lines, or the like. It is possible to hold in this limited region of the display, those words that a user considers to be important and by making use of the scrolling function subsequently read the entire description corresponding to the words.

When the content of the dictionary is stored on the MCD, a particular mark, e.g., asterisk (attribute) etc., may be attached to the heading for selected main words in the description, to gather only words with the asterisk (attribute) in the collection tranferred to the RAM memory. In addition, every time a user depresses a key, the asterisk in the description D may be moved blinking from words close to the heading sequentially to those remote therefrom. Thus, when the asterisk is located at a predetermined position, and the key is release, only particular main words are selected and displayed. When the [I/O] key is depressed, all of the above-mentioned data or a desired portion thereof will be automatically selected and those successively collected and displayed into the list of words used. In the collection, an attribute code indicating unmemorization is automatically added to the word heading.

A learning mode [LA/M] key is provided in the function key group 8. When this key is depressed, the learning mode of [A to M] is first set. When depressed once more, the learning mode of [M to A] is set. Be effecting the toggle depression three or more times, these modes are repeatedly alternated.

Then, by depressing the select [N/AL] key, either the unmemorized words to be learned or the entirre lists of words to be reviewed by display is selected. By toggling this key, each mode may be selected in turn. Every time the next [NEXT] key is depressed, paired index words and descriptions D from the list of words used, can be successively selected including both old ones and new ones. When the next [NEXT] key is continuously depressed, word selection can automatically shift or scroll from word to word at fixed time intervals, e.g., two seconds.

For example, when the user desires to "learn" the unmemorized words in the language learning mode "A to M" the function key [LA/M] is operated and the function key [N/AL] is set to the attribute of unmemorization. Thereafter when the [NEXT] key is depressed, the index word C next in order on the list of unmemorized words is displayed on the input display section 14. Responding to this, a user recalls the description D in the language B. Where the memory of the user is not settled or the word remaining is unmemorized, further depression of the [ANS] key recalls the description D (answer) from the corresponding list which is displayed on the output display section 13. Thus, the user confirms his memory or has the opportunity to commit the word to memory.

When the [NEXT] key is once again depressed, the display section 13 disappears and the unmemorized index word C next in order on the list is displayed on the input display section 14 and the cycle repeated.

On the other hand, in the opposite language mode [M to A] when the next [NEXT] key is depressed, only the description D in the language B, of the umemorized index word next in order is displayed on the output display section 13. Responding to this, the user recalls the corresponding index word C in the language A and displays the answer on the input display section 14, using the [ANS] key to make confirmation. When the [NEXT] key is again depressed, the answer on the input display section 14 is caused to disapper, and the description D of the next unmemorzied word on the list is displayed on the output display section 13. Thus, memory learning can be conducted by confirming the user's memory successively over the entire list.

When the learning mode key is set to a mode where the entire list is to be reviewed, the above-mentioned operation will be performed in connection with all words on the list regardless of whether or not an attribute has been attached to any word.

When an index word C, which had been previously unmemorized has been memorized, the attribute attached to the word displayed which indicates whether or not the word has been already memorized or has not yet been memorized) can be changed or provided simply by depressing the attribute change [CH] key.

The ability to effect a sound output for pronunciation of an index word C will now be explained. There can follow various known methods. Two examples will be described.

In accordance with the first method, the voice pronunciation of each index word C is subjected to A/D conversion and stored in the ROM, as in the music CD. The voice data thus obtained is stord along with a function code. During indexing, the voice data and function code is copied into the memory 5 of the ROM player 2. When the pronunciation [PNC] key is depressed the portion designated by the function code is transferred to the pronunciation memory 30. The sound output controller 31 reads the digital signal once, or a predetermined number of times every time the [PNC] key is depressed, or during the time in which depression of the key is continued. The digital signal is indicative of the sound or pronunciation of a particular word in a range designated by the function code which is subsequently converted (A/D) to the digital voice data using the same means as a music CD, thus to effect an output transferred to a sound output device 32 such as a speaker.

In accordance with the second method, a pronunciation or sound memory 33 corresponding to pronunciation symbols is provided in the player 2 to sequentially read the sounds in accordance with the pronunciation symbol code and to prepare a time train of sound intensity on the basis of the position, kind of accent and intonation used to synthesize a sound output. The synthesized sound output in then stored into the word sound memory 34 form which a sound output is transferred to the sound output device 32.

The first method has a drawback in that the memory capacity of the ROM must be large, but the advantage that real delicate pronunciation can be reproduced with fidelity. On the other hand, while the second method does not necessitate increasing the memory capacity of the ROM, it requires, however, a circuit for converting the code train to a pronunciation sound train, and allowing it to have accent. The second method also has the drawback that the sound obtained is artificial and real delicate pronunciation cannot be reproduced. It is preferable that the respective first and second methods be selectively used in accordance with the intended purpose of the electronic dictionary considering the respective advantages and drawbacks.

The function to effect a sound output of the description D will now be explained. In this case, the ROM is required to contain sound data for spelling and the pronunciation symbol for the index word as well as for the description corresponding thereto. It is desirable for the purpose of indexing that the spelling and the pronunciation symbol be written as codes. Thus, the description D may be written as a data train obtained by applying A/D conversion to sound, or may be all written as codes or pronunciation symbols. In the case of the data train, the sound data subjected to A/D conversion relating to the index word C and the description D includes a pronunciation symbol which is read into the RAM memory 5 by the ROM player 2. The sound output can then be obtained in accordance with the same system as that of ordinary music CD. In the case where the pronunciation symbol code train is used, the code train is stored in the pronunciation sound memory 33. The sound output can then be obtained by having the sound output controller 31 apply a sound synthesis processing signal to those words transferred from the memory 5 to the pronunciation code memory 30, in succession one by one on the basis of the kind and position of accent and the intonation. The sound output is produced on the sound output device 32. When the pronunciation [PND] key is depressed, the sound output is conducted in the same manner as in the case of the depression of the [PNC] key.

Where the sound cannot be sufficiently understood because the sound output is temporary, a repeat [RP] key is provided causing the sound output to be repeated once or a predetermined number of times every time it is depressed, or to continuously repeat when it is continuously depressed.

The electronic dictionary according to the present invention is intended mainly for private or personal use. In addition, the electronic dictionary can be connected to a central large optical disk in an office etc., an electronic dictionary using CD etc., or to the terminal of an information retrieval system through an interface, or as the terminal thereof. In the last instance, since electronic dictionary has a key input function, display function, a function for preparing a list of words used, or the like, it is conenient as the terminal. Although the advantage with such implementation is that the terminal is small-sized, the most advantageous point is that a list of words used is prepared for private use, so that individual persons can employ the device for learning with their terminal subsequently separated from the central system. Where the central system is an information retrieval system or a textbook, etc., the list of words used has the function of an electronic note or an electronic memorandum, thus providing a file peculiar to an individual file.

MANNER OF USE OF THE INVENTION

Explanation will be made in connection with a multiple or plural language dictionary where the index word C and the description D are in different languages.

When initially powered, the MCD is driven by the MCD drive 3. The user waits for a designated time period until the rotation frequency of the MCd reaches a prescribed rotation frequency, or until an output of a rotation frequency sensor determines that the MCD has reached a normal rotation frequency. The initial sequence data incorporated in the MCD is then read by the microcomputer MPU and is copied into the RAM memory 5 and the character font memory 6 etc. It is to be noted that the initial sequence data is composed of various control progrrams, i.e., a table or directory showing an existing area (block) in the MCD of the word groups having the same combination with respect to the combination of the number of characters designated from the word headings in the index word C and the description of the word concerned, the character font data for the characters, and the like.

The blank areas of the memory 5, the character code memory 9 and the image memory 10 are then reset. Finally, by a pre-set control program, the system is automatically placed in input mode, and "READY" is displayed on the output display section 13 of the display unit 12.

Every time the input/output [I/O] key is depressed, the MPU effects a switching operation so that the mode of the system is changed (i.e., toggled) between the input or output mode. In the input mode, "READY" is displayed on the input display area 14. When the input mode [A/M] key is toggled, the input mode of "A to M" (indicating the change from language A to language M) and "M to A" (indicating the change form language M to language A) is respectively selected.

Where the mod of "A to M" is selected, operation of the keyboard 7 will cause the MPU to enable characters of the index word C in the language A to be successively input from the word headings thereof from the character input key board 7, and displayed on the input display section 14. Where there is an error in the inputting operation, the error may be deleted by the clear (CE) key and replaced by a correct character. After inputting is correctly performed, the [I/O] key is depressed and the mode shifts to the output mode.

The MPU recognizes the number of characters designated from the word heading for the index word C, e.g., five characters to read from the table block or sector position on the MCD corresponding thereto so as to enable the readout controller 4 to read the block concerned. Ordinarily, the block has a memory capacity of about 2 KB. There are instances where a plurality of blocks are read. Then, the MPU indexes the index word C and its description D on the basis of the data of the block to thus "read to write" then into an index data sector in the RAM memory 5.

Susequently, the index word C is displayed on the first line of the input display section 14 and the description D is displayed on the output display section 13 from the top. It is desirable that the pronunciation symbol is also displayed on the first line. When the length of the discription D is longer than the number of lines of the output display section 13, e.g., six lines, the full description cannot be normally displayed. However, when the scroll UP[ ↑ ] key is depressed for a moment, the entire description may be observed by scrolling line by line. When the [ ↑ ] key is successively depressed, scrolling is conducted at predetermined time intervals, e.g., per one sound. Scrolling in the opposite direction is similarly performed by the DOWN [ ↓ ] key.

It is convenient that when all of a portion of the correlated word F in the description D appears on the first line of the output display section 13 the correlated word F is parallely displayed on the second line of the input display section 14. This is an example of hierarchy such that the index word C and the correlated word F are assumed as parent and child, respectively. When the second correlated word F2 is displayed on the first line of the output display section 13, by the subsequent scrolling in an upward direction, a control may be performed such that the word on the first line of the output display section 13 remains unchanged, while the word on the second line thereof is rewritten into the correlated word F2. Therefore, even when continued scrolling is conducted, and the correlated word F in the description D disappears, the correlated word F remains displayed on the input display section 14.

When scrolling in a downward direction, it is desirable to rewrite the correlated word F displayed on the input display section 14 before it moves to the second line of the output display section 13. For this purpose, it is necessary to successively store in the memory 5, the correlated words F extracted at the time of scrolling in an upward direction.

The learning assistance function in the present invention will now be explained. This learning assistanct function permits the preparation of alist of words which were used and the provision of attributes t discriminate between and unmemorized word and memorized word. This function can be said to be a sol called "electronic word noet." To realize this learning assistance function:

(1) The index word C and its corresponding discription D are displayed on the input and output display sections 14 and 13, respectively.

(2) The index word C and the correlated word F are respectively displayed on the first and second lines of the input display section 14, and the description D for the correlated word F is displayed on the lines below the first line of the output display section 13. Such content exist in the character code memory 9 in the form of code and may be preserved when the input/output [I/O] key is depressed. The MPU collects the memory content into the RAM memory 5 prior to toggling of the input/output key. The MPU provides in the memory 5 a directory sector containing the list fo words used in order of inputting.

When the learning mode key is first depressed, the mode of [A to m] is set. When depressed once more, the learning mode [M to A] is set. By effecting the repeated toggling, these modes are alternately set. Then, by depressing the select [N/AL] key, the list of unmemorized words or the entire list of words may be selected. By toggling this key, each list may be selected in turn.

In this condition, every time the next [NEXT] key is depressed, corresponding pairs of index words and descriptions D are successively selected from the old ones to new ones. When the next [NEXT] key is continuously depressed, the word slection can shift automatically from word to word within fixed time periods, e.g., two seconds.

To recall all the unlearned words, the learning mode is set to "A to M" by operation of the key [LA/M] and given the attribute of unmemorization by operation of the select [N/AL] key. Thus when the [NEXT] key is depressed, the index word C next in order on the ummemorized word list is displayed on the input displayed section 14. Responding to this, the user recalls the translation or the description D in the language B corresponding thereto. Where the user's memory is not settled or a word remains unmemorized, the user depresses the answer [ANS] key so that the translation or the description D (answer) is also displayed on the output section 13. Thus, the user confirms this memory or newly commits the word to memory.

When the [NEXT] key is again depressed, the display on the output display section 13 is caused to disappear. Thus, the unmemorized index word next in order on the list is displayed on the input display section 14.

On the other hand, in the mode [B to A], when the next [NEXT] key is depressed, only the description D in the language B corresponding to the unmemorized index word, next in order is displayed on the output display section 13. Responding to this, the user recalls the index word C in the language A and subsequently displays the answer on the input display section 14 by using the [ANS] key to thereby confirm his answer. When the [NEXT] key is depressed, the correct answer on the input display section 14 is caused to disappear, and the next description D of the unmemorized word, next in order on the list is displayed on the output display section 13. Thus, examination of the entire list is successively conducted, thereby making it possible to use the electronic dictionary of the invention to assist in learning.

When the pronunciation [PNC] key or [PND] key is depressed, the sound output of an index word or a description is conducted to the sound output device such as a speaker. It is preferable that the mode be caused to shift automatically from the output to the input mode by depression of the [I/O] key irrespective of the stat of the output mode.

THE ADVANTAGES WITH THE INVENTION the advantages obtained with the electronic dictionary according to the present invention are as follows:

(1) Since the index words and their descriptions are automatically or manually registered into the RAM memory 5 to create the word list, the present electronic dictionary is very convenient in that it can enable the user to conduct memory exercises by making use of the specific word lists in addition to utilizing the entire electronic dictionary solely as a dictionary, enabling the wide variety of practical applications.

(2) Since an attribute for discriminating between the unmemorized words and the memorized words can be given to each word on the word lists, it is very convenient to conduct memory exercise of selected words. Since the learning can be condcuted by skipping words which have been memorized, it is possible to conduct highly efficient learning.

(3) Since the attribute for discriminating between the unmemorized words and the memorized words can be changed during the learning steps, the electronic dictionary can be used in conjuction with the progress of learning, thus eliminating waste.

(4) Since sound output of the pronunciation of the index word C or the word to be learned can be made, study of correct pronunciation can be made.

(5) Since sound output of the description D can also be made, even an illiterate person or a blind person can use the electronic dictionary. qp (6) By providing a small-sized electronic dictionary using a disk or IC card having a diameter of the disk or the length of one side of the card, less than 3 inches and a memory capacity in a range from 2 MB to 128 MB, a device can be obtained that is very convenient to carry and because it can be miniaturized, even inserted into a pocket of European style clothes or underwear.

What is claimed is:

1. An electronic dictionary and learning device comprising a first memory for storing data of a plurality of entries, each entry comprising an index word and a corresponding description thereof, said description including a translation of said index word, a pronunciation symbol for said index word and a correlated word related to said index word, a second memory, means for retrieving from said first memory selected individual ones of said entries and causing said retrieved entries to be recorded in said second memory in the order of their retrieval, means for thereafter recalling from said second memory a selected list of index words and corresponding descriptions, means for sequentially displaying the entries on said selected list thereby to permit the user to study and review said listed entries, and means for attaching to given ones of said retrieved entries prior to recording in said second memory an attribute to indicate whether such given one is memorized by the user so that said retrieved entries with attributes may be recalled in a common list for further study, said display means including means for displaying said index word and corresponding description thereof independently of each other.

2. the electronic dictionary and learning device, according to claim 1, wherein the first memory is a ROM.

3. The electronic dictionary and learning device, according to claim 1 wherein the second memory is a RAM.

4. The electronic dictionary according to claim 1 wherein said index word and description thereof are in the same language.

5. The electronic dictionary according to claim 1 wherein said index word and description thereof are in a different language.

6. A language teaching method comprising the steps of storing in a large capacity memory ROM multi-language data of index words and corresponding description thereof, retrieving from the ROM one or a plurality of selected index words and their corresponding discriptions, recording the retrieved data in a RAM memory and forming a list thereof, maintaining the order in which the index words are chosen while said step of recording is preformed, recalling from the RAM memory the formed list whereby such recall is performed in the maintained order, displaying the recalled list so that the same can be viewed by the user to facilitate the teaching thereof, attaching to given index words of the formed list an attribute to indicate whether the given index word needs to be recalled for further study, and recording in RAM memory a common list of attributed index words sot that the same cna be recalled for intensified study.

* * * * *